(12) United States Patent
McKee

(10) Patent No.: US 7,480,797 B2
(45) Date of Patent: Jan. 20, 2009

(54) METHOD AND SYSTEM FOR PREVENTING CURRENT-PRIVILEGE-LEVEL-INFORMATION LEAKS TO NON-PRIVILEGED CODE

(75) Inventor: Bret McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 897 days.

(21) Appl. No.: 10/909,793

(22) Filed: Jul. 31, 2004

(65) Prior Publication Data

US 2006/0023884 A1  Feb. 2, 2006

(51) Int. Cl.
*H04L 29/00* (2006.01)
*G06F 9/46* (2006.01)

(52) U.S. Cl. .................... 713/164; 712/6; 712/220; 718/100

(58) Field of Classification Search ............ 712/6
See application file for complete search history.

(56) References Cited

U.S. PATENT DOCUMENTS

| 5,043,878 | A * | 8/1991 | Ooi ................... 712/42 |
| 7,082,507 | B1 * | 7/2006 | Christie et al. ........ 711/163 |
| 7,089,377 | B1 * | 8/2006 | Chen ................. 711/147 |
| 7,130,977 | B1 * | 10/2006 | Christie et al. ........ 711/163 |
| 2003/0101322 | A1 * | 5/2003 | Gardner .............. 711/163 |
| 2004/0064668 | A1 * | 4/2004 | Kjos et al. ........... 711/202 |

* cited by examiner

*Primary Examiner*—Matthew B Smithers

(57) ABSTRACT

Various embodiments of the present invention introduce privilege-level mapping into a computer architecture not initially designed for supporting virtualization. Privilege-level mapping can, with relatively minor changes to processor logic, fully prevent privileged-level-information leaks by which non-privilege code can determine the current machine-level privilege level at which they are executing. In one embodiment of the present invention, a new privilege-level mapping register is introduced, and privilege-level mapping is enabled for all but code invoked by privileged-level-0-forcing hardware events.

9 Claims, 3 Drawing Sheets

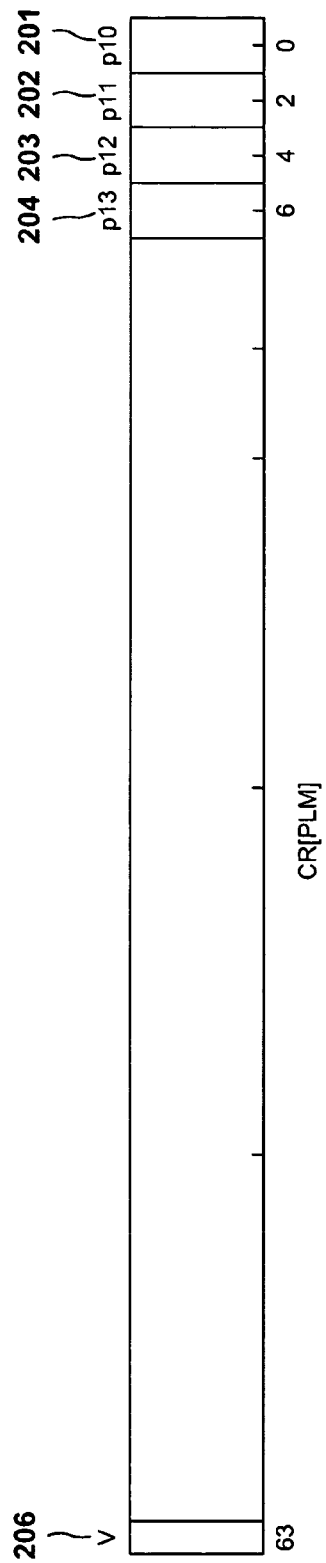
Figure 2
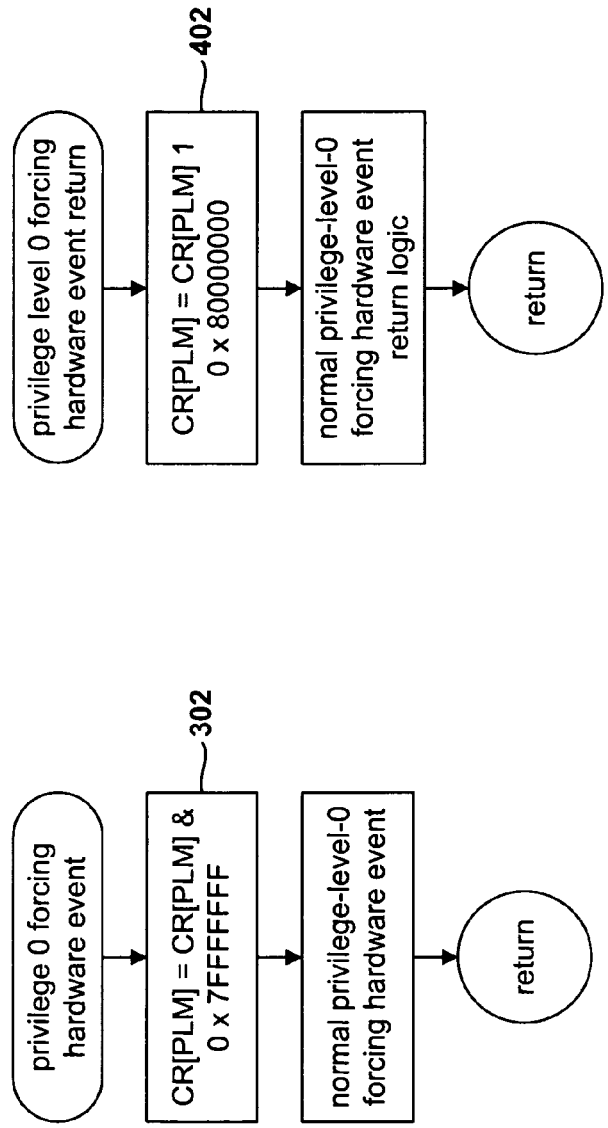
Figure 3
Figure 4

METHOD AND SYSTEM FOR PREVENTING CURRENT-PRIVILEGE-LEVEL-INFORMATION LEAKS TO NON-PRIVILEGED CODE

TECHNICAL FIELD

The present invention is related to computer architecture and, in particular, to a method and computer architecture for preventing exposure of current-privilege-level information to non-privilege code.

BACKGROUND OF THE INVENTION

Computer-security issues have become increasingly important in the past 20 years. Initially, computer security was addressed by physical securing large computer systems, and by various software-based techniques, including encryption, authorization techniques, and other security measures directed to preventing unauthorized access of secured systems or secured portions of computer systems. However, computer-system developers and computer-science theoreticians have realized that computer systems cannot be made fully secure using such software-based security measures, and physical security is not generally practical in the modern, densely interconnected computing environment.

In order to provide a hardware-level foundation for truly-secured computing, certain modern processor architectures, including the Intel® IA-64 processor architecture provide a number of different hardware privilege levels. The IA-64 processor architecture provides four privilege levels, from the most-privileged privilege level, privilege level 0, to the least-privileged privilege-level, privilege-level 3. Privilege level 0 is intended for execution of operating-system kernels in non-virtualized systems, and for execution of virtual monitors in virtualized computer systems. The intermediate privilege levels are designed for non-kernel operating systems routines and other code needing intermediate privilege levels, and privilege-level 3 is designed for execution of application programs.

In the Intel IA-64 architecture, processor resources, including registers and instructions, are partitioned into privileged and non-privileged resources. Only code executing at the highest privilege level, privilege-level 0, may access privileged processor resources, while code executing any of the four privilege levels may access the unprivileged processor resources. By partitioning processor resources into privileged and unprivileged resources, the Intel IA-64 architecture provides a hardware foundation for securing access to critical machine state from all but those core software routines needed for implementation of operating systems and virtual monitors. In the IA-64 processor architecture, memory resources are associated with privilege levels at the memory-page granularity. The associations are established through privileged instructions that manipulate privileged registers. The IA-64 architecture thus provides a mechanism for partitioning memory into different memory classes accessible to code executing at specified privilege levels. For example, secure memory may be associated with privilege-level 0, for exclusive access by code executing at privilege-level 0.

The IA-64 architecture is not implemented to explicitly support virtualization. Virtualization is a process by which a low-level software construct, referred to as a "virtual monitor," is introduced directly above the hardware level to provide, along with the hardware, a virtual-machine interface. Virtual-machine interfaces are useful for a number of reasons. First, operating systems can be developed to interface with a virtual-machine interface, rather than to directly interface with a machine interface. Operating systems developed in this fashion can run on any hardware platform on which a virtual monitor providing the virtual-machine interface is resident. Porting a virtual monitor to different hardware platforms, or developing a virtual monitor for a particular hardware platform, is a far less expensive process, in time and engineering resources, than porting an operating system to a particular hardware platform for which the operating system was not initially developed. A second utility provided by virtual monitors is that operating systems designed to assume full control of a machine can be concurrently run on a computer system by the virtual monitor, which multiplexes both processor execution cycles and processor resources between the concurrently running operating systems, much as an operating system multiplexes time and processor cycles between concurrently running processes.

In order to provide a virtual machine interface, the virtual monitor needs to provide to an operating system with the illusion that the operating system has full control of the machine resources, including privileged resources. In particular, the virtual monitor must execute at privilege-level 0 and provide to the operating system the illusion that the operating system is also executing at privilege-level 0, although the privilege-level 0 at which the operating system executes is a virtual privilege-level 0, and not the machine-level privilege-level 0 that only the virtual monitor can execute at. Operating systems assume they have full control of the machine, and that operating system interruption handlers, for example, are directly invoked by hardware, to run at privilege-level 0, on the occurrence of various external interrupts, exceptions, traps, and other events. The virtual monitor must maintain exclusive access to privilege-level 0, however, because the virtual monitor needs to trap, and emulate, attempts by the operating system to execute privileged instructions and to access privileged resources. Otherwise, the virtual monitor would lose control of the hardware, allowing one of several concurrently operating systems to fully appropriate machinery resources, to the detriment of other concurrently running operating systems. Moreover, the virtual monitor must maintain virtual-monitor data securely, or risk corruption and severe corruption-related consequences, such as unrecoverable crashes. The mechanism used by the virtual monitor to detect attempts by operating systems and other code to execute privileged instructions or access privileged resources is to arrange for the operating systems and other code to run at privilege-level 1 or lower, so that when the operating systems or other code attempt to execute a privileged instruction or access a privileged resource, a privileged instruction or privilege-level exception trap is generated, invoking a virtual-monitor interruption handler that can determine how to handle the attempted privileged instruction execution or privileged-resource access, including emulating execution of the privileged-level instruction or access to privileged-resource on behalf of the operating system or other code.

Had the IA-64 processor architecture been developed in order to provide for virtualization, the IA-64 processor architecture would have been designed to insure that no code or process, other than a process or code executing at privilege-level 0, could possibly determine the current privilege level at which the processor code is executing. However, this is not true in the IA-64 processor architecture. There are many ways, referred to as "privilege-level-information leaks," by which a non-privileged routine can determine the privilege level at which the non-privilege routine is executing. This allows non-privileged code to determine whether or not a virtual monitor is currently managing the computer system and providing a virtual machine interface to the operating system. If an operating system can detect the presence or absence of an underlying virtual monitor, the operating system can take steps to defeat or circumvent the virtual monitor, and to violate the virtual-machine interface established by the virtual monitor. This, obviously, compromises the virtual-machine interface and prevents development of fully secure and sound virtual monitors.

Many ways have been suggested for eliminating the privilege-level-information leaks inherent in the IA-64 architecture. One suggested method is to increase the number of privilege levels by four, to provide additional privilege levels for exclusive use by virtual monitors. In other words, if the 2-bit PSR.cpl field of the processor status register ("PSR") in the IA-64 architecture were expanded to three bits, eight, rather than four, privilege levels, could be specified. The top four privilege levels could then be used exclusively by the virtual monitor, leaving the four standard privilege levels for operating-system and non-virtual-monitor code. However, this change is not trivial, would require extensive changes to the IA-64 architecture, and would still be transparent to operating systems specifically developed for such an enhanced IA-64 architecture. For this reason, computer-system architects, designers, manufacturers and users have recognized the need for a cost-effective, robust method for preventing privileged-level leaks in the IA-64 architecture, and in similar processor architectures originally designed without an intent for supporting virtualization.

SUMMARY OF THE INVENTION

Various embodiments of the present invention introduce privilege-level mapping into a computer architecture not initially designed for supporting virtualization. Privilege-level mapping can, with relatively minor changes to processor logic, fully prevent privileged-level-information leaks by which non-privilege code can determine the current machine-level privilege level at which they are executing. In one embodiment of the present invention, a new privilege-level mapping register is introduced, and privilege-level mapping is enabled for all but code invoked by privileged-level-0-forcing hardware events.

BRIEF DESCRIPTION OF THE DRAWINGS

FIG. 2 shows a new CR[PLM] register that represents one embodiment of the present invention.

FIG. 3 illustrates an additional logic step added to IA-64 logic that is executed by an IA-64 processor when any of a variety of privilege-level-0-forcing hardware events occurs in one embodiment of the present invention.

FIG. 4 illustrates changes to the IA-64 architecture logic executed at completion of a privilege-level-0-forcing hardware event in one embodiment of the present invention.

DETAILED DESCRIPTION OF THE INVENTION

The present invention is directed to a relatively simple and efficient hardware enhancement of the IA-64 architecture to prevent privilege-level information leaks to non-privilege instructions. This enhancement is vital for developers of virtual monitors, who need to design a reliable and robust virtual-machine interface that cannot be penetrated by non-privileged code, including operating-system code.

Figure 1:
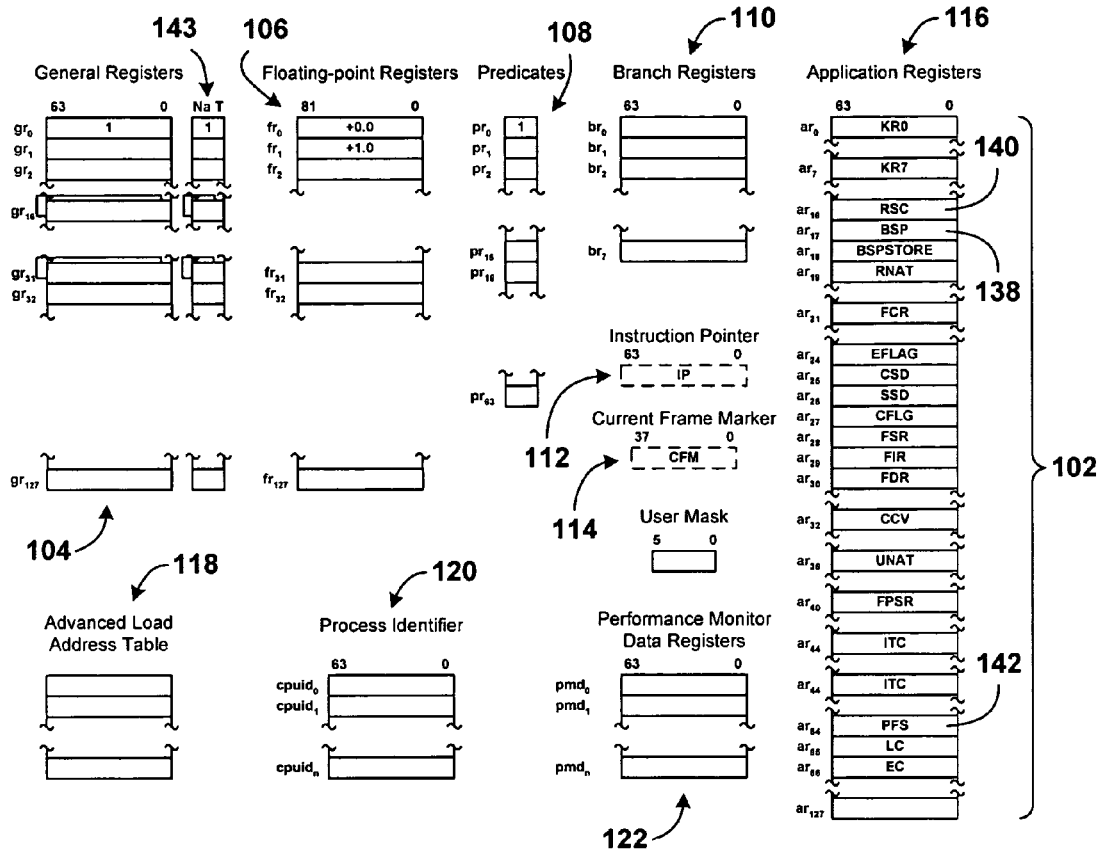
FIG. 1 shows the registers provided in the IA-64 architecture.
Figure 1:
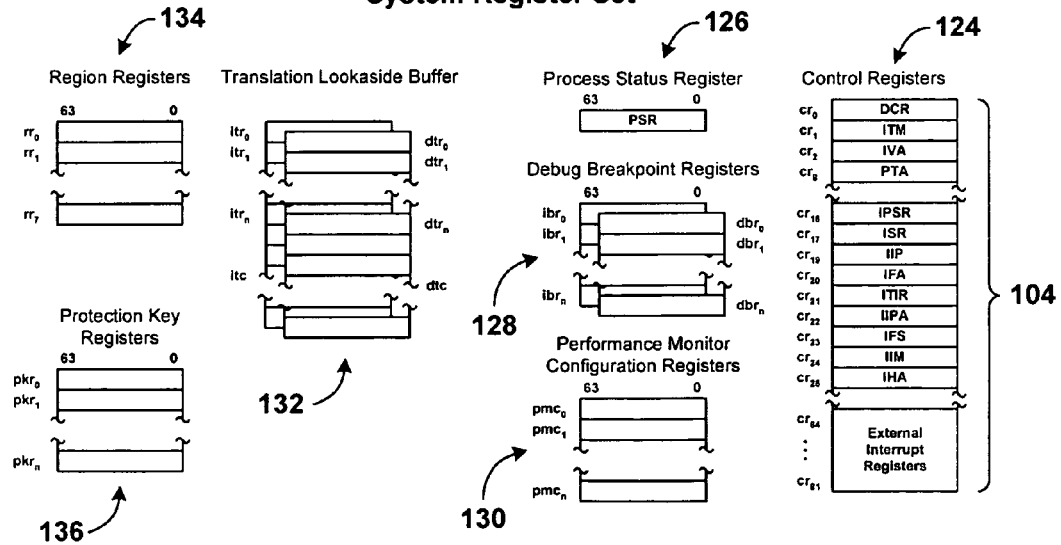

FIG. 1 shows the registers provided in the IA-64 architecture. The registers are partitioned into an application register set 102 and a system register set 104. In general, application registers are accessible at any priority level, while system registers are accessible only when the processor is currently at priority level 0, the highest priority level of the four priority levels 0, 1, 2, and 3 provided by the IA-64 architecture. The registers provided by the IA-64 architecture include a set of 128 64-bit general purpose registers 104, a set of 128 82-bit floating point registers 106, a set of 64 predicate registers 108, a set of 64 branch registers 110, an IP register 112, a current frame marker ("CFM") register 114, and a variety of special purpose registers including application registers ("AR") $AR_0$ through AR127 116, advance load address table registers 118, process-identify registers 120, and performance monitor data registers 122. The system registers, which are accessible only by processes or routines running at privilege level 0, include a set of control registers ("CR") 124, ranging from $CR_0$ to $CR_{81}$, a PSR register 126, break point registers 128, performance monitor configuration registers 130, a translation lookaside buffer 132, region registers 134, and protection key registers 136. Note that particular AR registers and CR registers have acronyms that reflect their use. For example, AR register $AR_{17}$ 138, the backing-store-pointer register, is associated with the acronym BSP, and this register may be alternatively specified as AR[BSP]. In many of the registers, single bits or groups of bits comprise fields containing values with special meanings. For example, the two least significant bits within register AR[RSC] 140 together compose a mode field which controls how aggressively registers are saved and restored by the processor. These two bits can be notationally specified as "AR[RSC].mode." Registers of particular relevance to embodiments of the present invention include the PSR register 126 that contains fields that control processor behavior and reflect processor state, including the two-bit PSR.cpl field that contains a numerical value indicating the privilege level at which the processor is currently operating, and the AR[PFS] application register 142, which contains a two-bit field AR[PFS].ppl that contains the privilege level of a previously executing routine, the AR[PFS] updated when a routine call instruction is executed.

One simple example of how non-privileged code can determine the current privilege level at which it is executing is to call a simple, 2-instruction assembly routine that returns the current contents of the AR[PFS] register. As discussed above, the AR[PFS] register contains the field AR[PFS].ppl, which contains the privilege level at which the calling routine was executing prior to calling the routine that returns the contents of the AR[PFS] register. As a result, the calling routine obtains its current privilege level.

In various embodiments of the present invention, one or more new system registers are introduced to the IA-64 architecture in order to provide a privilege-level map. In one embodiment, a single new 64-bit control register, CR[PLM], is added to the set of control registers within the set of system registers accessible only to code executing at the highest privilege level. FIG. 2 shows the new CR[PLM] register that represents one embodiment of the present invention. The CR[PLM] register includes four, 2-bit fields 201-204 that together occupy a least-significant byte within the CR[PLM], and a single-bit field 206 consisting of the most significant bit of the CR[PLM]. The four, 2-bit fields 201-204 include: (1) CR[PLM].pl0, which specifies the mapped, or actual privilege level corresponding to virtual privilege-level 0; (2)

CR[PLM].pl1, the mapped, or actual privilege level corresponding to virtual privilege-level 1; (3) CR[PLM].pl2, the actual, or mapped privilege level corresponding to virtual privilege-level 2; and (4) CR[PLM].pl3, the actual or mapped privilege level corresponding to virtual privilege-level 3. The single-bit field is referred to as CR[PLM].v. CR[PLM].v indicates whether or not privilege levels are currently being mapped. When the value of CR[PLM].v is "1," the contents of the four, 2-bit fields within the CR[PLM] are used to map the privilege level obtained from the PSR register field PSR.cpl, and the privilege level specified in other registers and stored values, including the field in the application register AR[PFS].pp1. When the value of CR[PLM].v is "0," no privilege-level mapping is carried out.

To close the current-privilege-level-information leaks, various embodiments of the present invention employ privilege-level mapping. Privilege-level mapping involves using internal mapping, facilitated by the new CR[PLM] register, of the current privilege level specified in the PSR.cpl field of the PSR register and stored in various fields and memory locations as a result of instruction execution, to machine-level, internal privilege levels. For example, the PSR.cpl may contain the privilege-level-value "0," indicating that the processor is currently executing at privilege-level 0. For all non-privileged code, the value currently stored in PSR.cpl indicates a virtual privilege level, and the virtual privilege level appears in all other resource fields and memory locations as if it were the machine-level, internal privilege level. However, internal logic of the IA-64 processor can access the privilege-level mapping register CR[PLM] to determine the machine-level, internal privilege level. Privilege-level mapping is turned off when code is invoked by the IA-64 processor that should run at machine-level, internal privilege-level 0, such as when a virtual-monitor interruption handler is invoked at machine-level, internal privilege-level 0. The virtual-monitor interruption handler can determine the virtual privilege level of the interrupted routine by accessing the PSR register and the CR[PLM] register. Privileged instructions only execute at machine-level, internal privilege-level 0. An attempt by a machine-level, internal privilege-level 1 operating-system routine, running at virtual privilege level 0, to execute a privileged instruction generates a privileged-instruction fault just as in a current IA-64 processor, because the logic of an IA-64 processor modified according to the present invention maps virtual-privilege-level 0 to machine-level, internal privilege-level 1. Small processor-logic changes needed to employ the new CR[PLM] register in order to map privilege levels are described, below, with reference to FIGS. 3-4.

FIG. 3 illustrates an additional logic step added to IA-64 logic that is executed by an IA-64 processor when any of a variety of privilege-level-0-forcing hardware events occurs in one embodiment of the present invention. Such privilege-level-0-forcing hardware events include interruptions, such as exceptions, external interrupts, and traps, which result in the privilege level being raised to privilege-level 0 by the IA-64 processor. Privilege-level-0-forcing hardware events represent the logical portal to privileged code execution in the IA-64 architecture. Step 302 in FIG. 3 is added to the logic normally executed by the IA-64 architecture upon occurrence of an interruption, or other privilege-level-0-forcing hardware events. This newly added step simply sets the CR[PLM].v field to the value "0" to turn off privilege-level mapping. Thus, in the modified IA-64 processor architecture, those events that trigger raising the machine-level, internal privilege level to machine-level, internal privilege level 0 in the unmodified IA-64 processor architecture continue to raise the machine-level, internal privilege level to privilege-level 0, despite the privilege-level mapping mechanism introduced to enhance the IA-64 architecture.

FIG. 4 illustrates changes to the IA-64 architecture logic executed at completion of a privilege-level-0-forcing hardware event in one embodiment of the present invention. The changes shown in FIG. 4 are symmetrical with respect to the changes shown in FIG. 3. Examples of instances in which the logic shown in FIG. 4 is executed include the return-from-interrupt instruction rfi, and other points in the IA-64-processor logic in which the processor lowers the privilege level from machine-level, internal privilege-level 0 back to a lower privilege level. A step is added to the logic involved in completion of a privilege-level-0-forcing hardware event, shown as step 402 on FIG. 4, which sets the value of the field CR[PLM].v to "1" to re-enable privilege-level mapping. Thus, privilege-level mapping is enabled for all but machine-level, internal-privilege-level-0 code.

Figure 5:
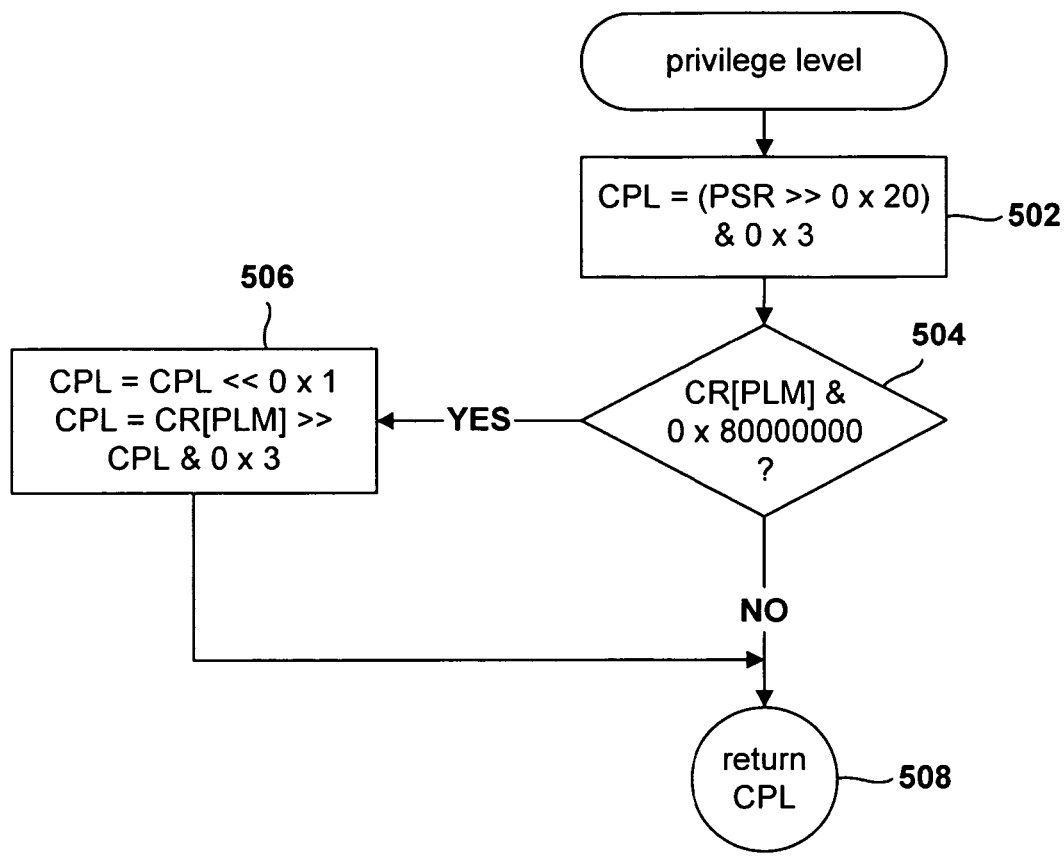
FIG. 5 illustrates the enhancements to current-privilege-level determination in an IA-64 processor needed to implement privilege-level mapping in one embodiment of the present invention.

The final change to the IA-64 processor logic needed to enhance the IA-64 processor logic to carry out privilege-level mapping involves modifying the method by which the IA-64 processor logic determines the current priority level during execution of various IA-64 instructions. FIG. 5 illustrates the enhancements to current-privilege-level determination in an IA-64 processor needed to implement privilege-level mapping in one embodiment of the present invention. In step 502, the processor obtains the contents of the PSR.cpl field as the current privilege level "CPL". In the traditional-IA-64 architecture, this single step 502 represents the entire logic for determining the current privilege level. However, in the modified IA-64-processor logic that employs privilege-level mapping, two additional steps are needed. In step 504, the processor logic determines whether the field CR[PLM].v has the value "1," enabling privilege-level mapping. If so, then in step 506, the processor uses the CPL obtained in step 502 as an index into the CR[PLM] register to determine the current machine-level, internal privilege level corresponding to the current virtual privilege level determined in 502. The current machine-level, internal privilege level is returned in step 508, rather than the current virtual privilege level, obtained in Step 502.

Because the CR[PLM] is a system register, it can only be accessed and written by internal processor logic and code executing at machine-level, internal privilege level 0. Thus, a virtual monitor can set up privilege level mapping, disable and enable privilege-level mapping, and fully control the processor state. However, privilege-level mapping is not visible to code not executing at less privileged, machine-level, internal privilege levels.

Although the present invention has been described in terms of a particular embodiment, it is not intended that the invention be limited to this embodiment. Modifications within the spirit of the invention will be apparent to those skilled in the art. For example, multiple privilege-level mapping registers may be employed, rather than the single CR[PLM] privilege-level mapping register of the described embodiment.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for preventing non-privileged code from determining the machine-level, internal privilege level at which the non-privileged code is executing, the method comprising:

introducing a privilege-level-mapping mechanism accessible only to code executing at a highest machine-level, internal privilege that maps virtual-privilege-level values to specified machine-level, internal privilege-level values;

disabling the privilege-level mapping mechanism upon occurrence of a highest-machine-level-internal-privilege-forcing hardware event; and enabling the privilege-level mapping mechanism at completion of a highest-machine-level-internal-privilege-forcing hardware event.

2. The method of claim 1 wherein the privilege-level-mapping mechanism is a system register that includes a field indicating whether or not privilege-level mapping is enabled, and a field for each virtual privilege level indicating a machine-level, internal privilege level corresponding to each virtual privilege level.

3. The method of claim 2 further including altering a computer processor to, during instruction execution, map virtual-privilege-level values stored in registers to machine-level, internal privilege-level values, when the field indicating whether or not privilege-level mapping is enabled indicates that privilege-level mapping is enabled.

4. A computer processor comprising:
registers;
instruction execution logic;
memory bus interfaces; and
a privilege-level-mapping mechanism accessible only to code executing at a highest machine-level, internal privilege that maps virtual-privilege-level values to specified machine-level, internal privilege-level values.

5. The computer processor of claim 4 further including:
logic that disables the privilege-level mapping mechanism upon occurrence of a highest-machine-level-internal-privilege-forcing hardware event; and
logic that enables the privilege-level mapping mechanism at completion of a highest-machine-level-internal-privilege-forcing hardware event.

6. The computer processor of claim 4 wherein the privilege-level-mapping mechanism is a system register that includes a field indicating whether or not privilege-level mapping is enabled, and a field for each virtual privilege level indicating a machine-level, internal privilege level corresponding to each virtual privilege level.

7. The computer processor of claim 6 further including:
logic that, during instruction execution, maps virtual-privilege-level values stored in registers to machine-level, internal privilege-level values, when the field indicating whether or not privilege-level mapping is enabled indicates that privilege-level mapping is enabled.

8. A method for providing a virtual machine environment by a virtual monitor running on a computer processor the method comprising:

providing the computer processor including registers, instruction execution logic, memory bus interfaces; and a privilege-level-mapping mechanism accessible only to code executing at a highest machine-level, internal privilege that maps virtual-privilege-level values to specified machine-level, internal privilege-level values;

using virtual-privilege-level mapping to map a highest virtual privilege level to a machine-level, internal privilege level less than a highest-machine-level-internal-privilege level;

executing virtual monitor routines at highest-machine-level-internal-privilege level to trap all attempts by non-virtual-monitor code to execute privileged instructions or access privileged resources and emulate highest-machine-level-internal-privilege-level execution of privileged instructions and access to privileged resources.

9. A computer readable medium encoded with computer instructions that, when accessed and executed by a processor within a computer system, implement the method of claim 8.

* * * * *

UNITED STATES PATENT AND TRADEMARK OFFICE
CERTIFICATE OF CORRECTION

| | | |
|---|---|---|
| PATENT NO. | : 7,480,797 B2 | Page 1 of 1 |
| APPLICATION NO. | : 10/909793 | |
| DATED | : January 20, 2009 | |
| INVENTOR(S) | : Bret McKee | |

It is certified that error appears in the above-identified patent and that said Letters Patent is hereby corrected as shown below:

In column 4, line 17, delete "AR127" and insert -- $AR_{127}$ --, therefor.

In column 8, line 21, in Claim 8, after "processor" insert -- , --.

Signed and Sealed this

Twenty-sixth Day of May, 2009

JOHN DOLL
*Acting Director of the United States Patent and Trademark Office*